United States Patent [19]

Kitamura

[11] Patent Number: 5,217,236
[45] Date of Patent: Jun. 8, 1993

[54] O-RING SEAL OF GEARED-MOTOR

[75] Inventor: Hiroshi Kitamura, Kadoma, Japan

[73] Assignee: Matsushita Electric Industrial Co., Ltd., Kadoma, Japan

[21] Appl. No.: 821,927

[22] Filed: Jan. 16, 1992

[30] Foreign Application Priority Data

Jan. 24, 1991 [JP] Japan .................. 3-31776

[51] Int. Cl.$^5$ .............................................. F16J 15/10
[52] U.S. Cl. ...................... 277/168; 277/170; 277/190; 285/918
[58] Field of Search ............... 277/170, 171, 101, 105, 277/117, 118, 190, 168; 285/918, 341, 349, 379

[56] References Cited

U.S. PATENT DOCUMENTS

| 2,470,256 | 5/1949 | McIlroy | 285/349 X |
| 2,539,846 | 1/1951 | Lewis et al. | 277/168 |
| 3,055,670 | 9/1962 | Sampson | 277/168 |
| 3,173,712 | 3/1965 | Zahuranec et al. | 285/349 X |
| 3,720,223 | 3/1973 | Goellner | 277/171 X |
| 3,758,072 | 9/1973 | Herd | 277/171 X |
| 4,015,745 | 4/1977 | Petrangelo | 285/349 X |
| 4,648,740 | 3/1987 | Carlson | 277/170 X |
| 4,913,635 | 4/1990 | Ochiai et al. | 277/168 X |

FOREIGN PATENT DOCUMENTS

| 00485037 | 7/1952 | Canada | 285/349 |
| 0680277 | 2/1964 | Canada | 277/236 |
| 0061752 | 10/1982 | European Pat. Off. | 277/11 |
| 1177428 | 9/1964 | Fed. Rep. of Germany | 285/918 |
| 0671466 | 5/1952 | United Kingdom | 285/918 |

Primary Examiner—William A. Cuchlinski, Jr.
Assistant Examiner—James K. Folker
Attorney, Agent, or Firm—Cushman, Darby & Cushman

[57] ABSTRACT

An O-ring seal configuration between a motor unit and a reduction gear head of a geared-motor is improved. An, O-ring holder is defined by a flange face of a bracket, which is fit to a frame of the motor unit and a guide groove, which is formed on an outer face 7d of a circular boss. A circular vertical wall of the frame has a specific excess height over the flange face; whereby when the reduction gear head is coupled to the motor unit, the guide groove and the circular vertical wall cooperatively prevents the O-ring from become dislodged and misaligned in the coupling face and from slipping off of the bracket.

2 Claims, 5 Drawing Sheets

O-RING SEAL OF GEARED-MOTOR

BACKGROUND OF THE INVENTION

1. Field of the Invention

The present invention relates to an O-ring seal of a small-sized geared-motor which is to be used as an actuator of a conveyer or a machine tool and has a reduction gear head mounted detachably from a motor unit.

2. Description of the Prior Art

Machines and tools used in the industrial world have diversified in recent years. Particularly, in the field of geared-motors wherein a motor unit and a reduction gear head are integrated, the number of combinations of motor units and reduction gear heads, is very large. Additionally, motor units are functionally classified, while reduction gear heads are classified by the reduction gear ratio. Therefore, generally, the motor units and the reduction gear heads of geared motors are stored separately. A motor unit and a reduction gear head, which are respectively selected for satisfying the aim, are subsequently assembled as a geared-motor for actual use.

Typically a grease-bath lubrication system is adopted in the lubrication of the reduction gear head of the geared-motor. A geared-motor using such a lubrication system is free from the restriction of the orientation of the mounting of the geared-motor and its lubrication is easy. Furthermore, noise-reduction of the reduction gear and extension of the service time period of the geared-motor can be achieved by adopting a grease-bath lubrication system. For sealing the coupling portion of the motor unit and the reduction gear head of the geared-motor, an O-ring seal is widely used.

A conventional O-ring seal of the geared-motor is described referring to FIGS. 3, 4 and 5. FIG. 3 is a cross-sectional side view of the conventional geared-motor having an O-ring seal. In FIG. 3, a conventional geared motor consists of a motor unit 50 and a reduction gear-head 51.

The reduction gear head 51 comprises: a reduction gear train 1 having an output shaft 1a and gears 1b, 1c, 1d, 1e and 1f; plural bearings 16, 17, 18, 19 . . . for bearing the output shaft 1a and gear shafts 1g and 1h; and an oil seal 13 for sealing lubricant grease 15 so as not to leak out from the gaps between the output shaft 1a and the gear case 2.

The motor unit 50 comprises: a frame 3; a stator core 4 which is fit to and fixed on an inner face 3b of the frame 3; a bracket 7 which is press-fit to an upper end of the inner face 3b; bearings 8 and 9 respectively provided on a center hole 7a of the bracket 7 and a center hole 3a of the frame 3 for bearing a rotor shaft 5; a rotor assembly 6 which is fixed to the rotor shaft 5; a brake system 11 provided on bottom parts of the rotor assembly 6 and the frame 3; and an oil seal 14 provided between the rotor shaft 5 and the bracket 7 so as not to leak out the lubricant grease 15 from inside of the gear case 2 of the reduction gear head 51 to inside of the frame 3 of the motor unit 50. An O-ring 20 is provided between an outer periphery of a circular boss 7c of the bracket 7 and a bevel 2b of the gear case 2.

FIG. 4 is a perspective view showing the construction of the seal part of the conventional geared motor. In FIG. 4, the motor unit 50 and the reduction gear head 51 are connected by plurality of screw bolts 31 and nuts 30.

FIG. 5 is an enlarged cross-sectional side view showing a seal part of the conventional geared-motor of FIG. 3 designated by "Y". In FIG. 5, an outer face 7d of the circular boss 7c of the bracket 7 fits to the inner face 2a of the gear case 2 for centering the rotor shaft 5. The rotor shaft 5 must be positioned substantially at the center of the motor unit 50 for coupling a gear part 5a of the rotor shaft with the initial gear 1f of the reduction gear train 1. The bevel 2b is formed in a bottom end part of the inner face 2a of the gear case 2. The O-ring 20 is pinched by the bevel 2b of the gear case 2, the outer face 7d of the circular boss 7c and a flange face 7b of the bracket 7. The O-ring 20 is deformed by a compressive force which is the result of fixing the reduction gear head 51 to the motor unit 50 by the screw bolts 31 and the nuts 30 (shown in FIGS. 3 and 4). Thereby, in most cases, the deformed O-ring 20 tightly seals the inside of the geared-motor which is assembly composed of the reduction gear-head 51 and the motor unit 50. The flange face 7b of the bracket 7 and a flange face 3c of the frame 3 are substantially on the same level.

The above-mentioned conventional sealing construction of the geared-motor shown in FIG. 5, however, has a disadvantage that the O-ring 20, which is laid on a corner of the outer face 7d and the flange face 7b of the bracket 7, is liable to be easily displaced upward even by a light touch of a finger before or when the reduction gear-head 51 is coupled to the motor unit 50. This is because a height "B" designated in FIG. 5 of the circular boss 7c is small because of the miniaturization of the geared-motor. And furthermore, the O-ring 20 is easily caught by a finger at the inner edge of the flange face 3c when the reduction gear head 51 is coupled to the motor unit 50. Furthermore, the O-ring 20 can easily slip off from an open end part 7f of the circular boss 7c when the reduction gear head 51 is detached from the motor unit 50.

If the reduction gear head 51 and the motor unit 50 are coupled under a condition where the O-ring 20 is missings or has been slipped off, the sealing of the reduction gear-head 51 and the motor unit 50 is not completed, because either the O-ring 20 is missing or is misaligned, and hence does not serve as a sealing member. As a result, the lubricant grease 15 in the reduction gear head leaks out to the outside of the gear case 2 or to the inside of the motor unit 50.

SUMMARY OF THE INVENTION

A purpose of the present invention is to provide an improved O-ring seal for a geared-motor, whereby an O-ring is securely positioned where the O-ring is to be mounted.

An O-ring seal configuration of a geared-motor in accordance with the present invention comprises:

a gear case containing a reduction gear train and having an O-ring pressing part formed on an open end part thereof;

a frame for containing a stator and a rotor assembly of an electric motor, the frame having a flange to which the gear case is fixed, and having an offset part on an end of an inner face;

a bracket having a circular boss which is to be fit to an inner face of the gear case, a flange which is fit to the offset part of the frame, and has a thickness thinner than a height of the offset part and an O-ring holder which is defined by the upper face of the flange and a guide groove formed on an outer face of the circular boss adjoining the flange; and an O-ring which is positioned on the O-ring holder, so as to seal a gap between the gear case and the frame.

In the O-ring seal of the geared-motor in accordance with the present invention which is described above, the O-ring is held on the O-ring holder. Furthermore, the circular vertical wall having excess of height between the frame and the flange of the bracket prevents the O-ring from being dislodged by a finger from the outer face of the circular boss.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE PREFERRED EMBODIMENTS

Figure 1:
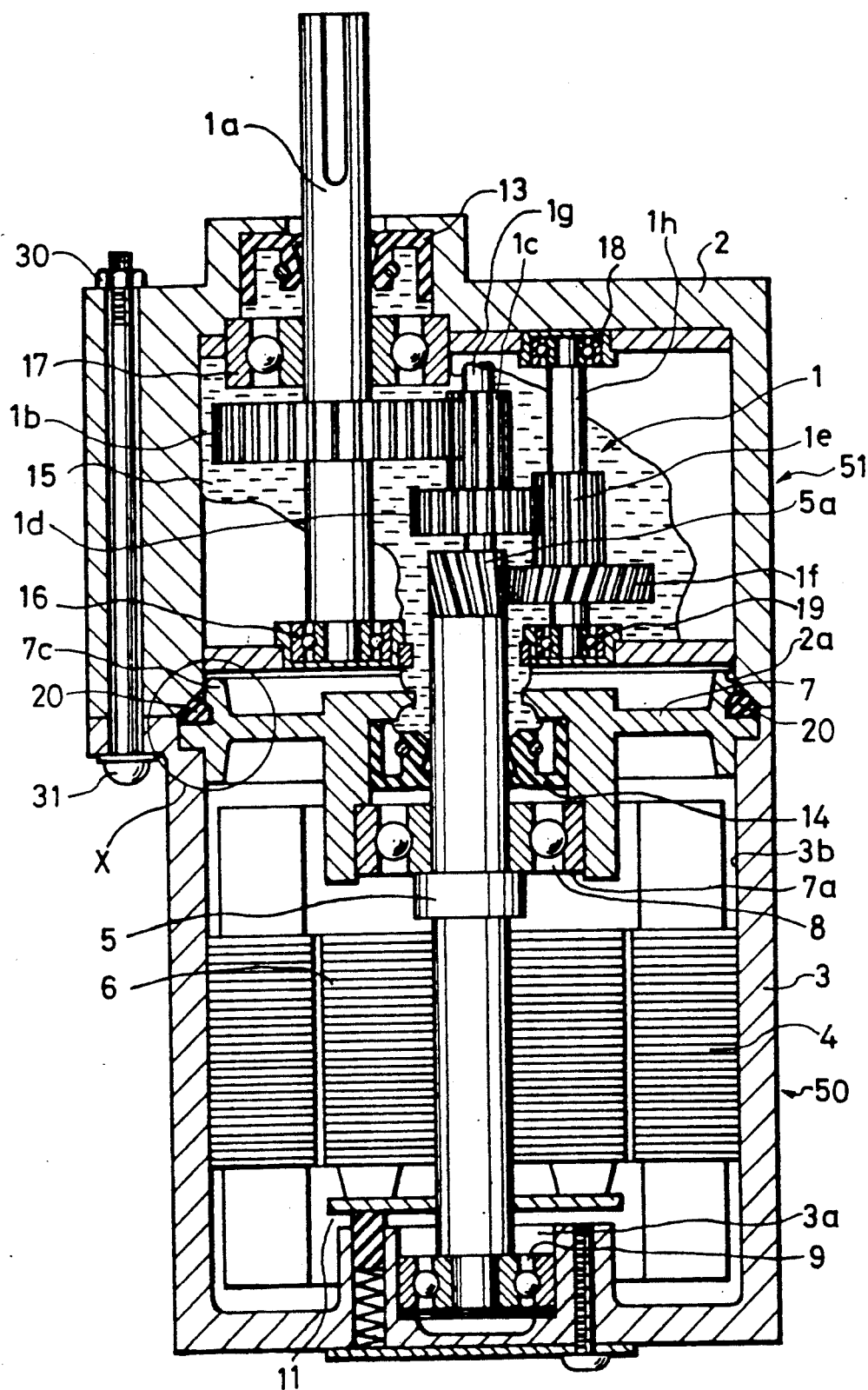
FIG. 1 is a cross-sectional side view showing the construction of a geared motor with an O-ring seal in accordance with the present invention.
Figure 2:
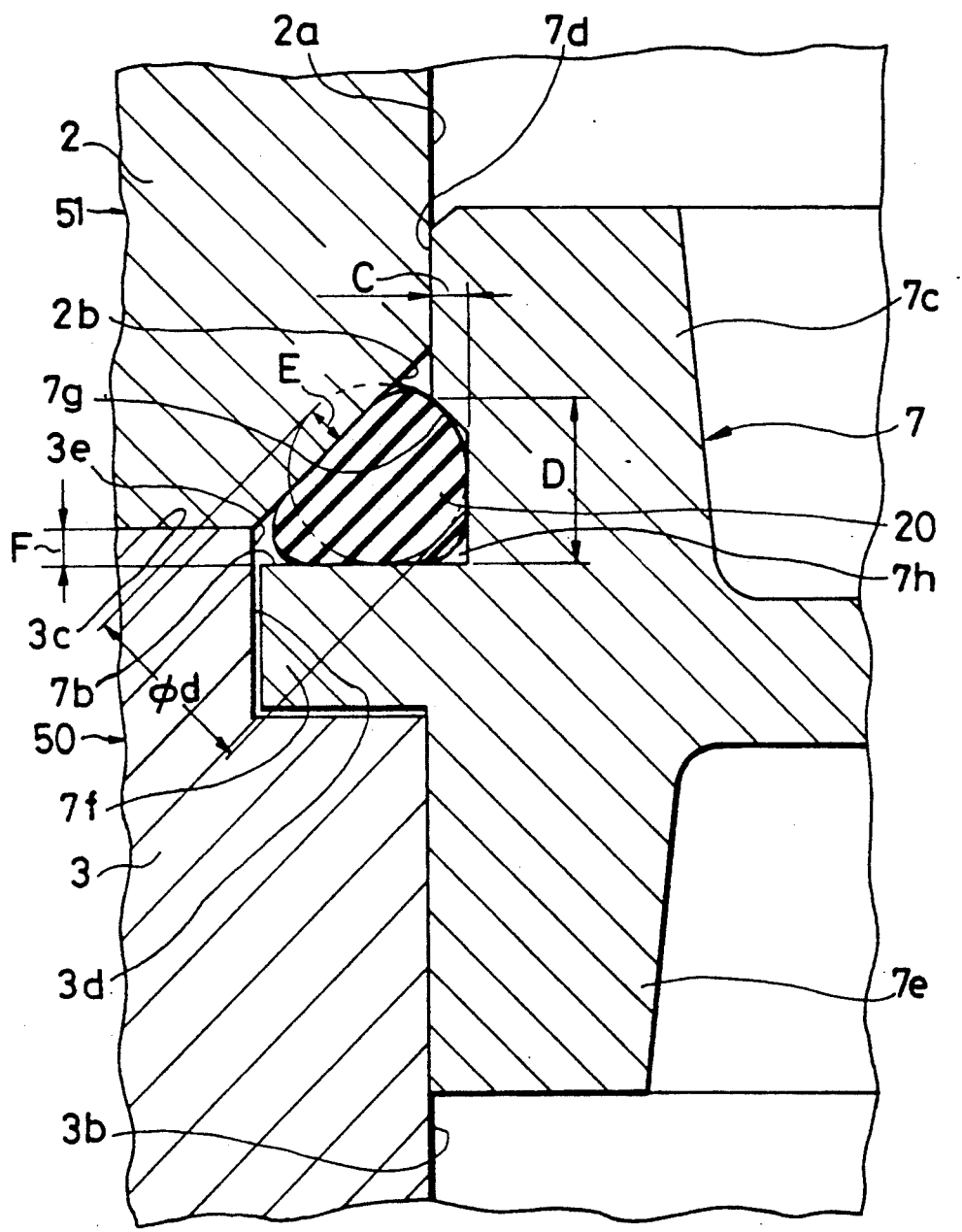
FIG. 2 is an enlarged cross-sectional side view showing details of the O-ring seal in accordance with the present invention which is shown by "X" in FIG. 1.
Figure 3:
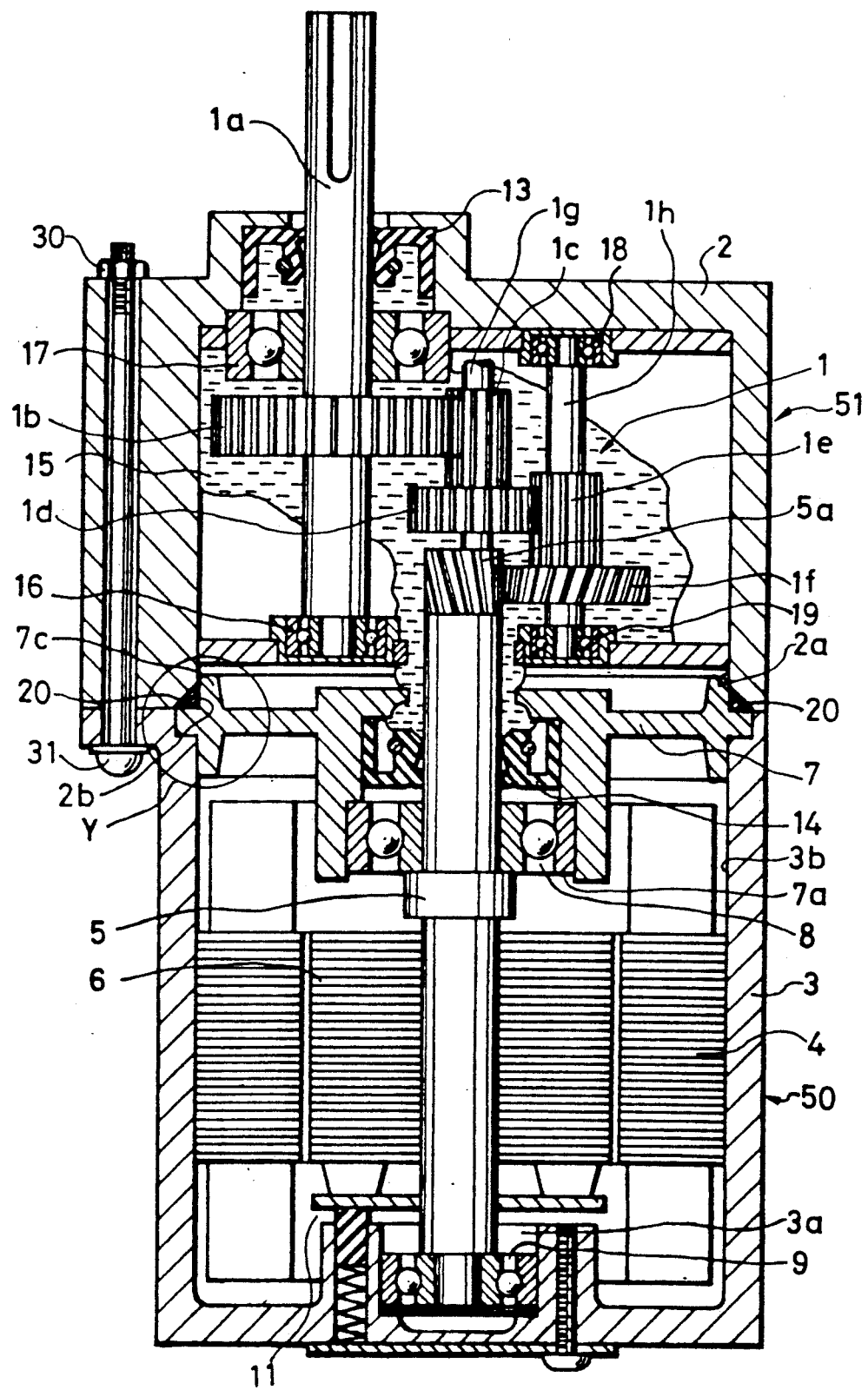
FIG. 3 is the cross-sectional view showing the construction of the a prior at geared-motor.
Figure 4:
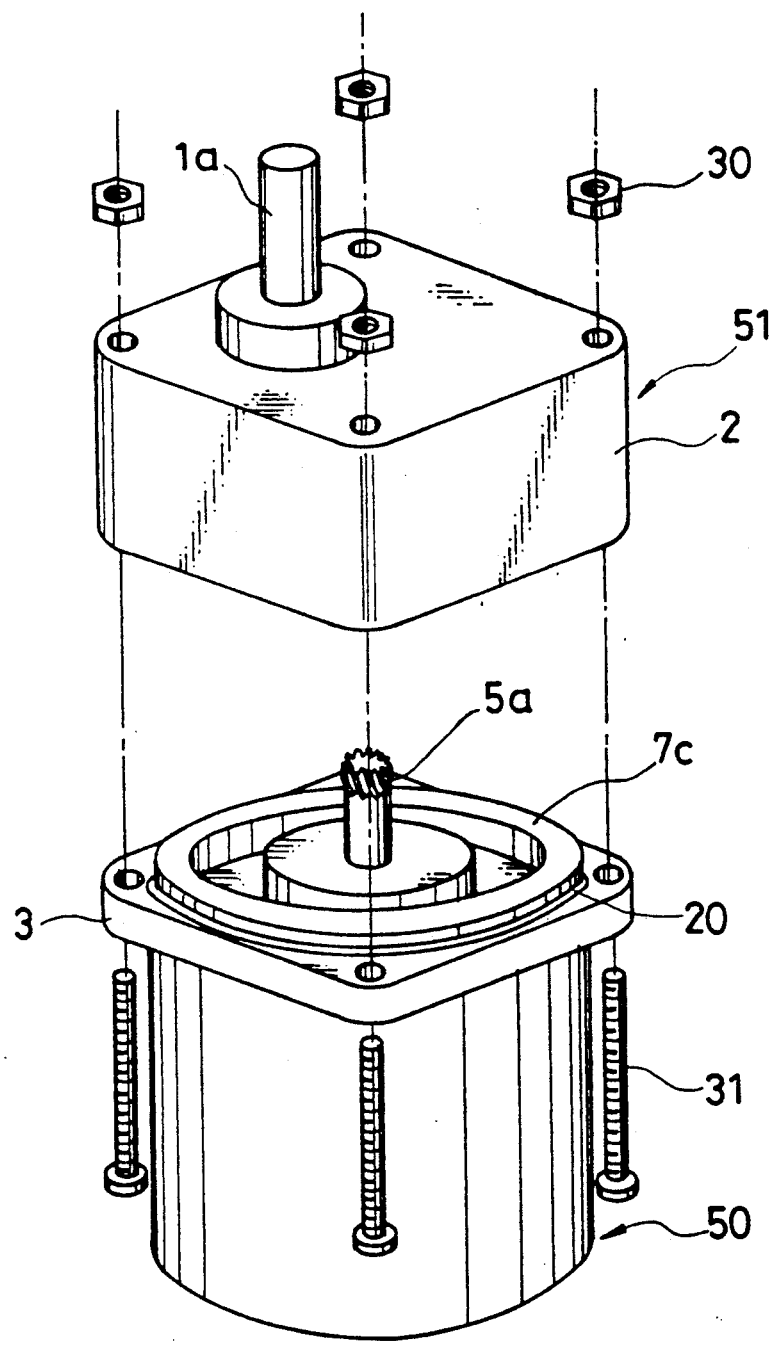
FIG. 4 is the perspective view showing the construction of the seal part of the a prior art geared-motor.
Figure 5:
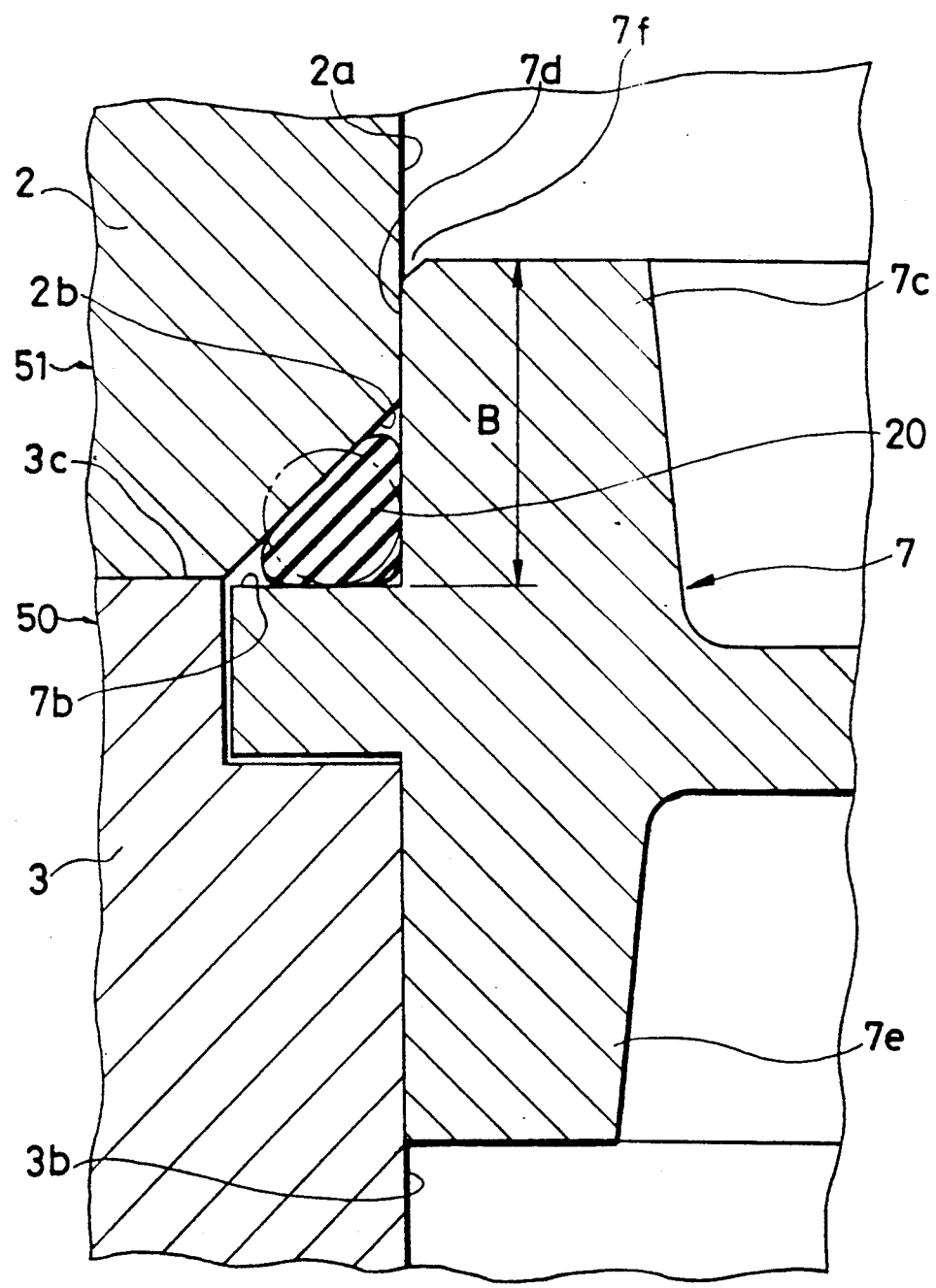
FIG. 5 is the enlarged cross-sectional side view showing the details of a prior art O-ring seal.

A preferred embodiment of an O-ring seal of a geared motor in accordance with the present invention is described referring to FIGS. 1 and 2.

In FIG. 1, a geared-motor with an O-ring seal in accordance with the present invention comprises a motor unit 50 and a reduction gear head 51. The reduction gear head 51 comprises: a reduction gear train 1 having an output shaft 1a and gears 1b, 1c, 1d, 1e and 1f; plural bearings 16, 17, 18, 19 . . . for bearing the output shaft 1a and gear shafts 1g and 1h; and an oil seal 13 for sealing lubricant grease 15 so as not to leak out from the gaps between the output shaft 1a and the gear case 2.

The motor unit 50 comprises: a frame 3; a stator core 4 which is fit to and fixed on an inner face 3b of the frame 3; a bracket 7 which is press-fit to an upper end of the inner face 3b; bearings 8 and 9 provided on a center hole 7a of the bracket 7 and a center hole 3a of the frame 3 for bearing a rotor shaft 5, respectively; a rotor assembly 6 which is fixed to the rotor shaft 5; a brake system 11 provided on bottom parts of the rotor assembly 6 and the frame 3; and an oil seal 14 provided between the rotor shaft 5 and the bracket 7 so as not to leak out the lubricant grease 15 from inside of the gear case 2 of the reduction gear head 51 to inside of the frame 3 of the motor unit 50.

FIG. 2 is an enlarged cross-sectional view showing details of the O-ring seal shown by "X" in FIG. 1. In FIG. 2, a circular offset part 3d is formed in the vicinity of an open end 3e of the inner face 3b of the frame 3. A flange 7f and/or a lower circular boss 7e are/is fit to the offset part 3d and/or the inner face 3b of the frame 3. The of the flange 7f of the bracket 7 is slightly thinner than height of the offset part 3d of the frame 3. Therefore, there is formed a circular vertical wall having excess of a height "F" as shown in FIG. 2 defined as the distance between a flange face 3c of the frame 3 and the flange face 7b of the bracket 7. A circular guide groove 7g is formed on an outer cylindrical face 7d of the circular boss 7c of the bracket 7. And the groove 7g is adjoining to the flange face 7b. Therefore, an O-ring holder 7h is defined by horizontal upper flange face 7b and the groove 7g. The depth and the width of the groove 7g are respectively designated by "C" and "D" in FIG. 2. The depth "C" of the groove 7g is selected in a range of 15–25% of a diameter "$\phi d$" of the cross-section of the free-state O-ring 20. According to many experiments, if the depth "C" of the groove 7g is shallower than 15% of the free-state diameter "$\phi d$" of the O-ring 20, the depth "C" is insufficient for holding the O-ring in the groove making it in easy for the O-ring 20 to slip off the circular boss 7c. Conversely, if the depth "C" is deeper than 25% of the diameter "$\phi d$" of the O-ring 20, the sealing performance of the O-ring 20 becomes insufficient probably owing to lack of cross-sectional deformation of the O-ring 20.

A deformation allowance of the O-ring which is designated by E in FIG. 2 is now described. A proper deformation allowance is important to obtaining a sufficient sealing performance of the O-ring 20. When the motor unit 50 and gear head 51 are attached by tightening the screw bolts 31 and nuts 30, the O-ring 20 receives a pressing force, from O-ring pressing faces such as the bevel 2b and the flange face 7b. The O-ring 20 is deformed by the pressing force and tightly adheres on the surface of the groove 7g of the circular boss 7c, the flange face 7b and the bevel 2b. Thereby, the O-ring 20 forms a tight seal.

A natural or free-state of the O-ring 20 is shown by a dotted line in FIG. 2. The compressed O-ring is drawn as it is disposed contacting the flange face 7b and the outer face of a part of the groove 7g of the circular boss 7c. A ratio "G" of the deformation allowance "E" against the natural diameter "d" of the O-ring 20 is defined by the following equation.

$$G = \frac{E}{d}$$

The ratio "G" needs to be above 8% to provide the O-ring 20 with adequate sealing performance. Accordingly, the depth "C" of the groove 7g is delimited in a predetermined range to achieve the sealing performance.

Furthermore, the width "D" of the groove 7g also defined to a predetermined value so that the O-ring can not be easily dislodged from the groove 7g. When the natural diameter "$\phi d$" of the O-ring 20 is, for example, 1.5 mm, the depth "C" and the width "D" of the groove 7g are defined 0.3 mm and 1.4 mm, respectively.

As shown in FIGS. 1 and 2, the bracket 7 and the frame 3 are press-fit in a manner to form the appropriate circular vertical wall having an excess of height "F" between the flange face 7b of the bracket 7 and the face 3c of the frame 3. The height designated by "F" should be in a range of 10~25% of the free-state diameter "$\phi d$" of the O-ring 20. The circular vertical wall having excess of height "F" serves to prevent the slippage of the O-ring 20 in a direction parallel to the axis of the circular boss 7c when the gear case 2 of the reduction gear head 51 is coupled and fit to the circular boss 7c of the bracket 7 which is press-fit to the frame 3 of the motor unit 50. If the height designated by "F" is larger than the above-mentioned range in relation to free-state diameter "φd" of the O-ring 20, the sealing performance of the O-ring 20 becomes insufficient. In the afore-mentioned embodiment, the offset "F" is preferably about 0.2 mm if the natural diameter of the O-ring 20 is 1.5 mm.

As mentioned above, once the O-ring 20 is provided in the O-ring holder 7h which is defined by the flange face 7b and the groove 7g, the O-ring 20 hardly slips upward on the outer surface 7d of the circular boss 7c in the direction parallel to the axis thereof. As a result, the sealing performance of the geared-motor in accordance with the present invention is not damaged.

In the above-mentioned embodiment, the circular vertical wall having excess of height "F" is formed between the surface 3c of the frame 3 and the flange face 7b of the bracket 7. A circular wall can be provided in an outer periphery of the flange face 7b of the bracket 7 in a manner to be even to the surface 3c when the bracket 7 is fit to the frame 3, which is a not shown in the figure. Thereby, substantially the same effect for preventing the slippage of the O-ring 20 can be performed.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An O-ring seal configuration of a geared-motor comprising:
    a gear case containing a reduction gear train and having an O-ring pressing part formed on an open end part thereof;
    a frame for containing a stator and a rotor assembly of an electric motor, said frame having a vertical flange portion to which said gear case is fixed, an having an offset part on an end of an inner face of said frame;
    a bracket having:
        a circular boss portion which is to be fit to an inner face of said gear case;
        a horizontal flange portion which is fit to said offset part of said frame, having a thickness less than a height of said offset part; and
        an O-ring holder portion which is defined by an upper face of said horizontal flange portion and a guide groove formed on an outer face of said circular boss adjacent to said horizontal flange; and
    an O-ring which is positioned on said O-ring holder portion such that the O-ring seals a gap between said gear case and said frame.

2. An O-ring seal of a geared-motor in accordance with claim 1, wherein:
    a depth of said guide groove is in a range of 15–25% of a cross-sectional diameter of said O-ring when said O-ring is not under a compressive load; and
    a circular vertical inner wall of said offset part extends above said upper face of said horizontal flange by a distance in a range of 10–25% of a cross-sectional diameter of said O-ring when said O-ring is not under a compressive load.

* * * * *